(12) United States Patent
Heuer (10) Patent No.: US 9,611,407 B1
(45) Date of Patent: Apr. 4, 2017

(54) REPOSITIONABLE MERCHANDISING STRIP

(71) Applicant: SONOCO DEVELOPMENT, INC, Hartsville, SC (US)

(72) Inventor: Mark H. Heuer, Florence, KY (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 14/943,147

(22) Filed: Nov. 17, 2015

(51) Int. Cl.
C09J 7/02 (2006.01)
C09J 133/00 (2006.01)
C09J 121/00 (2006.01)

(52) U.S. Cl.
CPC ........... C09J 7/0217 (2013.01); C09J 7/0214 (2013.01); C09J 7/0278 (2013.01); C09J 121/00 (2013.01); C09J 133/00 (2013.01); C09J 2201/134 (2013.01); C09J 2201/606 (2013.01); C09J 2400/226 (2013.01); C09J 2421/00 (2013.01); C09J 2433/00 (2013.01)

(58) Field of Classification Search
CPC ...... C09J 7/0217; C09J 7/0214; C09J 7/0278; C09J 121/00; C09J 133/00; C09J 2201/128; C09J 2201/134; C09J 2201/606; C09J 2400/226; C09J 2431/00; C09J 2433/00; Y10T 428/14; Y10T 428/1481
See application file for complete search history.

(56) References Cited

U.S. PATENT DOCUMENTS

| | | | | |
|---|---|---|---|---|
| 3,857,731 A | * | 12/1974 | Merrill, Jr. | C09J 7/0217 428/314.4 |
| 4,310,137 A | * | 1/1982 | Frye | F16B 47/003 248/205.3 |
| 4,573,590 A | | 3/1986 | Ellis | |
| 4,950,517 A | * | 8/1990 | Loggins | G09F 15/02 156/249 |
| 5,876,817 A | * | 3/1999 | Mathna | B42F 1/00 40/391 |
| 6,006,929 A | | 12/1999 | Leonard | |
| 6,109,582 A | | 8/2000 | Repaci et al. | |
| 6,120,867 A | * | 9/2000 | Hamerski | A47G 1/175 428/121 |
| 6,162,534 A | * | 12/2000 | Hamerski | C09J 7/0225 248/205.3 |
| 6,168,829 B1 | * | 1/2001 | Russ | C09J 7/02 427/208.4 |
| 7,762,407 B2 | | 7/2010 | Speed et al. | |
| 7,854,978 B1 | * | 12/2010 | Nygard | C09J 7/02 428/343 |

(Continued)

*Primary Examiner* — Patricia L Nordmeyer
(74) *Attorney, Agent, or Firm* — Miller, Matthias & Hull LLP (57) ABSTRACT

A repositionable merchandising display strip is provided. The display comprises a thin, flat body and a layer of adhesive on the front and back surfaces of the body. The front removable adhesive layer releasably holds products and the back removable adhesive layer is formulated so that the display can be removably adhered to a surface such as glass, wood, metal or other materials commonly found in retail stores. The display may further comprise a peel-away front layer releasably attached to the front removable adhesive layer and a peel-away back layer releasably attached to the back removable adhesive layer.

13 Claims, 7 Drawing Sheets

(56) References Cited

U.S. PATENT DOCUMENTS

2002/0009568 A1* 1/2002 Bries .......................... C09J 7/02
                                                                                             428/40.1
2009/0269534 A1* 10/2009 Montiforte ................ B32B 7/06
                                                                                              428/41.8

* cited by examiner

REPOSITIONABLE MERCHANDISING STRIP

BACKGROUND OF THE INVENTION

Field of the Invention

This disclosure relates to a retail display commonly referred to as a merchandising strip. More particularly, this disclosure relates to a merchandising strip that can be repositioned from one surface to another and that uses an adhesive to hold articles for display.

Description of the Related Art

Typical merchandizing strips comprise a plastic strip with vertically arranged hooks or clips for holding products. The products may be almost any small, lightweight product, including packaged snack foods and consumer products. The hooks and clips can make removing the products from the strip cumbersome, often requiring the consumer to hold the strip while removing the product.

The merchandising strips typically are suspended from a shelf or other structure by a hook, clip, patch of hook and loop fastening material, adhesive pad or other means. This hanging means limits potential locations where the products can be displayed. And the fact that such strips comprise multiple components adds to their cost and complexity.

Furthermore, such strips may lose their ability to communicate a point-of-sale marketing message as the products are removed from the strip.

The present disclosure is designed to solve the problems described above.

BRIEF SUMMARY OF THE INVENTION

The present disclosure relates to a repositionable merchandising display for displaying products. In one embodiment the repositionable merchandising strip comprises a thin, flat body covered on both sides with permanent adhesive, vinyl or other flexible plastic carriers adhered to the front and back permanent adhesives, a layer of front removable adhesive covering some or all of the front carrier to releasably hold the products, and a layer of back removable adhesive covering some or all of the back carrier. The strip can be removably adhered to a vertical surface. The front removable adhesive layer and the back removable adhesive layer may be layers of micro bead adhesives that do not form permanent bonds with the surface or with the products.

In a second embodiment the repositionable merchandising strip comprises a thin, flat, flexible substrate having a front surface and a back surface, a layer of front removable adhesive covering some or all of the front surface and formulated to releasably hold the products 30, and a layer of back removable adhesive covering some or all of the back surface. Again, the strip can be removably adhered to a vertical surface. The substrate may be vinyl or other flexible plastic carrier. The layer of front removable adhesive and the layer of back removable adhesive may be micro bead adhesives that do not form permanent bonds with the surface or with the products.

In a third embodiment the repositionable merchandising strip comprises hooks or other attachment means to hold the products to the front of the strip and a back removable adhesive layer so that the strip can be repositioned. More particularly, the strip comprises a thin, flat body, a layer of permanent adhesive covering some or all of the front and back surfaces of the body, a carrier adhered to the back layer of adhesive, a layer of back removable adhesive disposed on some or all of the carrier and hooks or other attachment means adhered to the front surface of the body by the front layer of permanent adhesive.

DETAILED DESCRIPTION OF THE INVENTION

While the invention described herein may be embodied in many forms, there is shown in the drawings and will herein be described in detail one or more embodiments with the understanding that this disclosure is to be considered an exemplification of the principles of the invention and is not intended to limit the disclosure to the illustrated embodiments.

Figure 1:
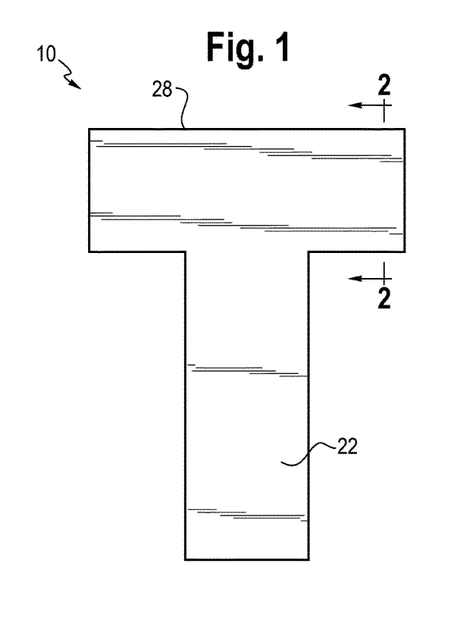
FIG. 1 is a plan view of a merchandising strip according to a first embodiment.
Figure 10:
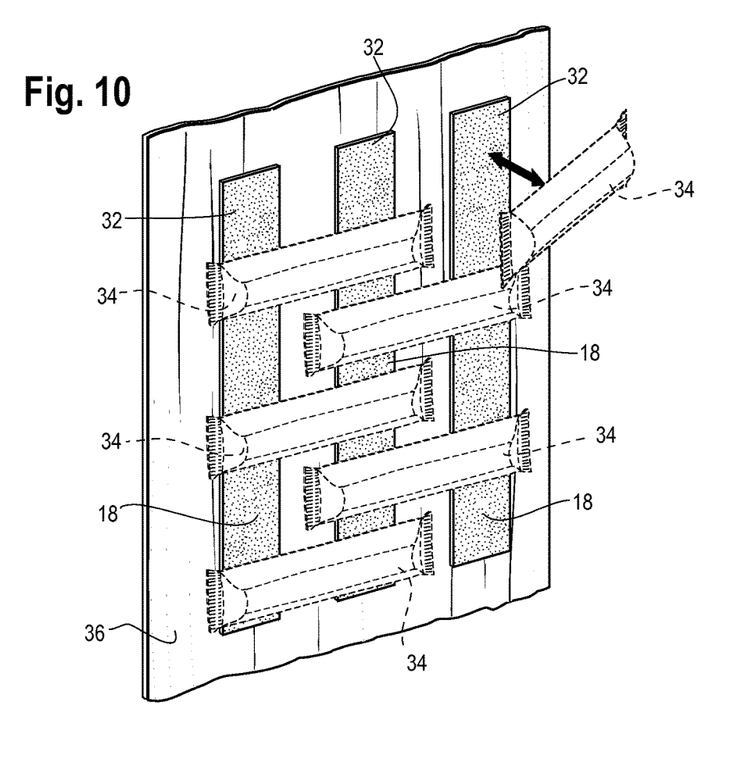
FIG. 10 is a perspective view of three merchandising strips according to the first embodiment shown with products.
Figure 11:
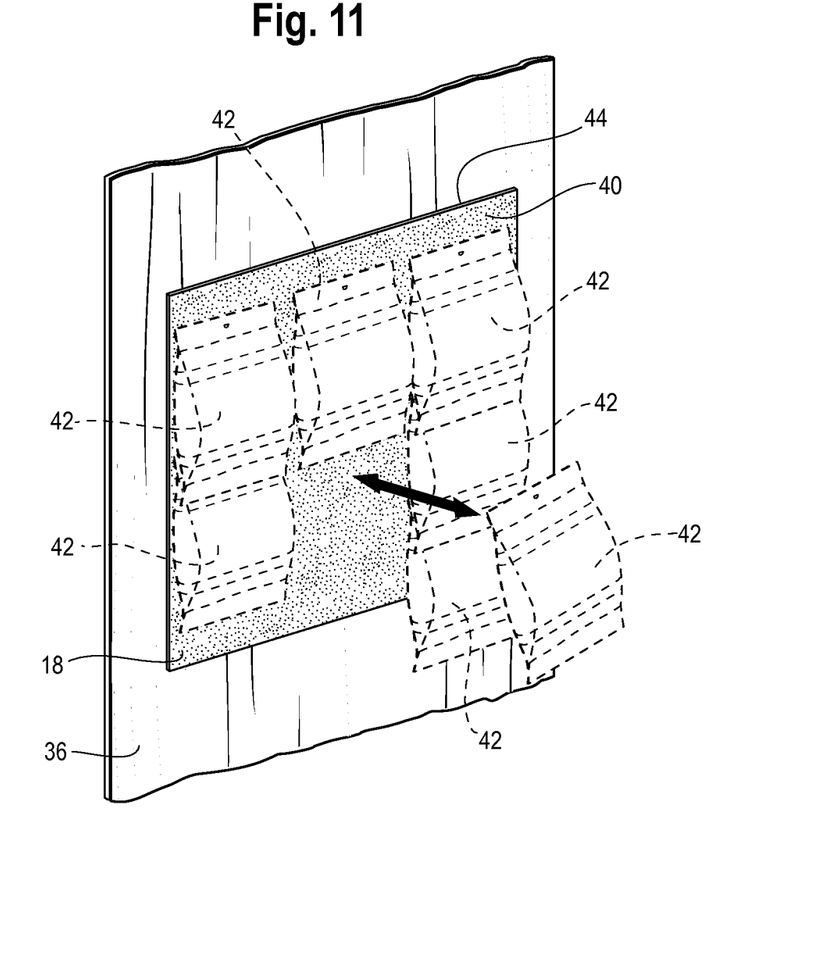
FIG. 11 is a perspective view of another merchandising strip according to the first embodiment shown with products.

FIG. 1 is a plan view of a repositionable merchandising strip 10 according to a first embodiment. The strip 10 shown in the figure is "T" shaped, but it may be any suitable shape, including "I" shaped as shown in FIG. 10 and rectangular as shown in FIG. 11.

Figure 2:
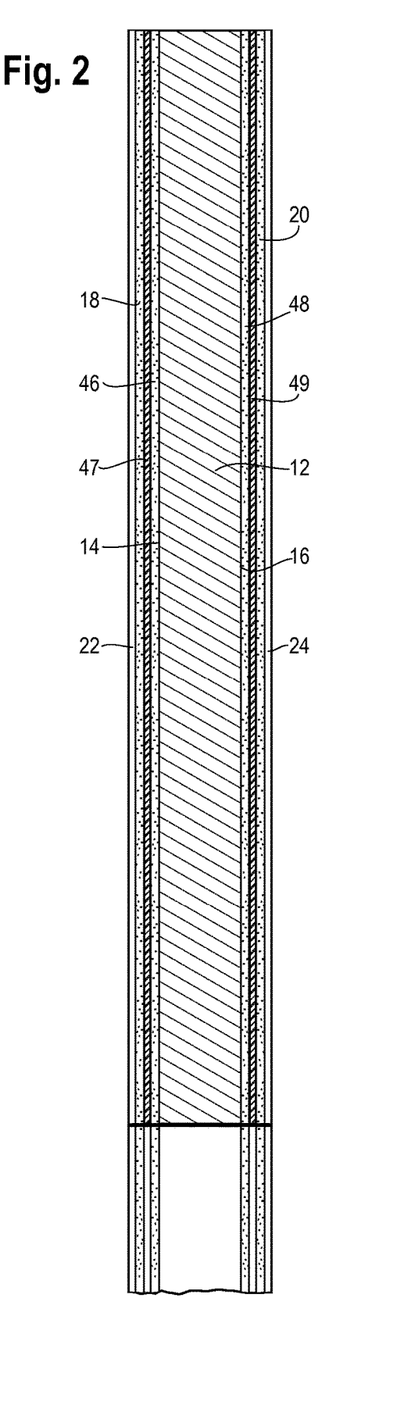
FIG. 2 is a cross sectional view of the merchandising strip of FIG. 1 taken along line 2-2.

FIG. 2 is a cross-sectional view of the merchandising strip 10 of FIG. 1 taken along line 2-2. The strip 10 comprises a thin, flat body 12 made of plastic or other material. The body 12 may be a single layer of material as shown in the figure or it may be folded into two or more layers. Regardless of the number of layers, the body 12 has a front surface 14 and a back surface 16. The strip 10 further comprises a layer of front permanent adhesive 46 applied to some or all of the front surface 14 and a layer of back permanent adhesive 48 applied to some or all of the back surface 16. The strip 10 further comprises a front carrier 47 adhered to the front permanent adhesive layer 46 and a back carrier 49 adhered to the back permanent adhesive layer 48.

The strip 10 further comprises a layer of front removable adhesive 18 applied to some or all of the front carrier 47 and a layer of back removable adhesive 20 applied to some or all of the back carrier 49. The removable adhesives 18, 20 preferably are micro bead adhesives. The back removable adhesive layer 20 used for all applications and the front removable adhesive layer 18 used for medium weight applications (in which the products 30 are medium weight products) may be a proprietary acrylic based micro bead adhesive available from Service Litho-Print Inc. of Oshkosh, Wis. under the trademark Ex-Static®. The front removable adhesive layer 18 used for heavy applications (in which the products 30 are heavy weight products) may be a proprietary pressure sensitive rubber based adhesive (PSA) available from Essentra Plastics LLC of Forest Park, Ill. under the trademark Remo One. Both of these adhesives provide repositionable properties and do not form permanent bonds. By contrast, traditional adhesives used in foam tapes are made from vinyl acrylic which does create a permanent bond.

Figure 3:
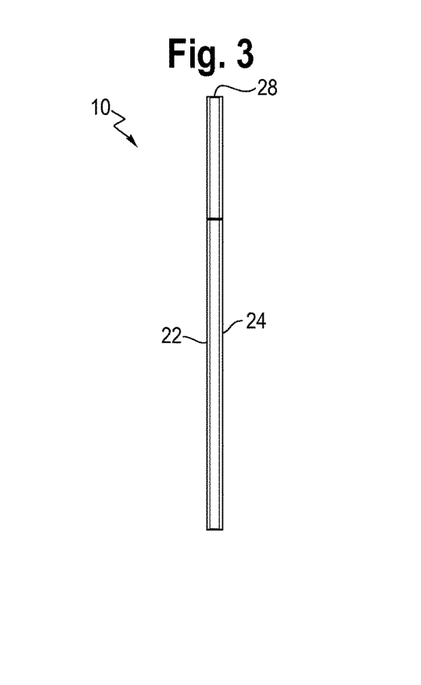
FIG. 3 is a side view of the merchandising strip of FIG. 1.

FIG. 3 is a side view of the merchandising strip 10 of FIG. 1. The strip 10 may comprise a peel-away front layer 22 and a peel-away back layer 24. Preferably the peel-away front layer 22 is releasably attached to the front removable adhesive layer 18 and the peel-away back layer 24 is releasably attached to the back removable adhesive layer 20.

Figure 4:
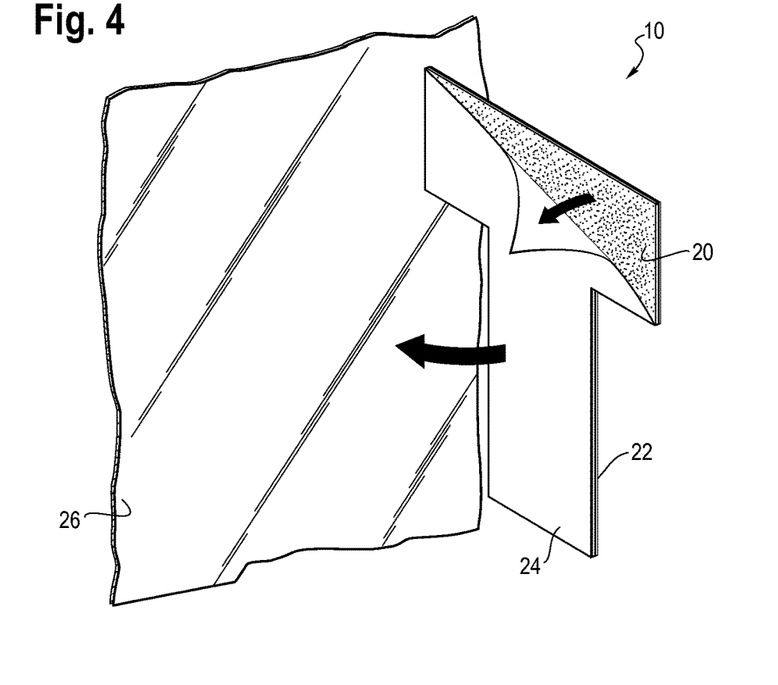
FIG. 4 is a perspective view of the merchandising strip of FIG. 1 shown being attached to a surface.

FIG. 4 is a perspective view of the merchandising strip 10 of FIG. 1 shown being attached to a surface 26, typically a vertical surface. The peel-away back layer 24 is being removed to expose the back removable adhesive layer 20.

The back removable adhesive layer 20 may cover the entire back surface 16 of the strip 10, allowing the strip 10 to be mounted to a vertical surface 26 in any orientation, including sideways, that is, with the top edge 28 on the side.

The strip 10 is unitary, that is, the body 12, the front and back permanent adhesive layers 46, 48, the front and back carriers 47, 49, and the front and back removable adhesive layers 18, 20 form a single structure. This characteristic results in an inexpensive, easy to install strip 10. The front surface of the front carrier 47 may carry graphics, text or other indicia for aesthetic, advertising or other purposes.

The front removable adhesive layer 18 and the back removable adhesive layer 20 may be made from the same adhesive or different adhesives. The front removable adhesive layer 18 should be made from an adhesive selected to adhere to plastic and other materials commonly used to package items sold in retail stores, especially items displayed on merchandising strips. The back removable adhesive layer 20 should be made from an adhesive selected to adhere to glass, wood, metal and other types of materials commonly found in retail stores.

Figure 5:
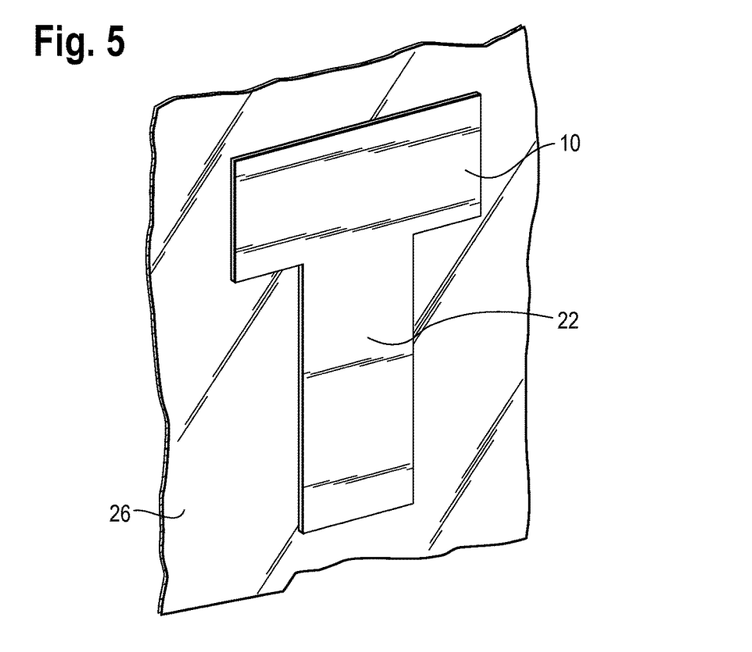
FIG. 5 is a perspective view of the merchandising strip of FIG. 1 shown attached to a surface and before a protective layer is peeled away.

FIG. 5 is a perspective view of the merchandising strip 10 of FIG. 4 shown attached to the vertical surface 26 but before the peel-away front layer 22 is removed.

Figure 6:
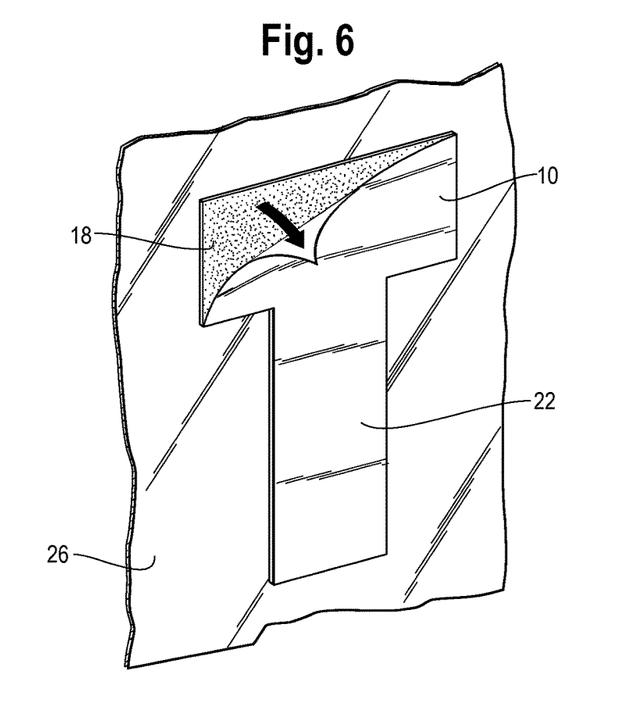
FIG. 6 is a perspective view of the merchandising strip of FIG. 5 shown attached to a surface while a protective layer is being peeled away.

FIG. 6 is a perspective view of the merchandising strip 10 of FIG. 5 shown attached to the vertical surface 26 while the peel-away front layer 22 is being removed.

Figure 7:
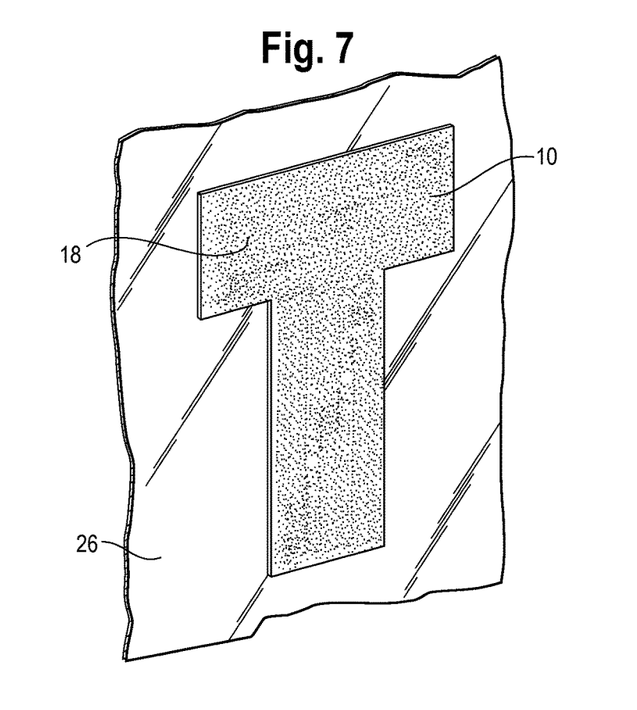
FIG. 7 is a perspective view of the merchandising strip of FIG. 6 shown attached to a surface after the protective layer is peeled away.

FIG. 7 is a perspective view of the merchandising strip 10 of FIG. 6 shown attached to the vertical surface 26 after the peel-away front layer 22 has been removed. The front removable adhesive layer 18 allows products to be removably adhered to the body front surface 14.

Figure 8:
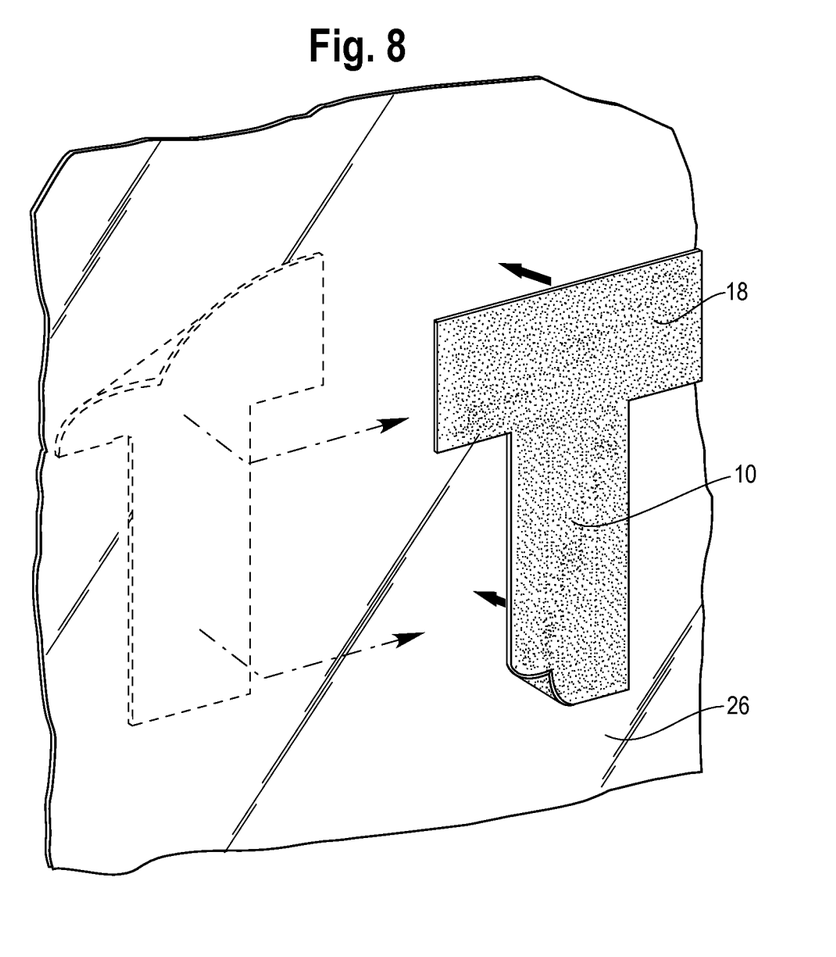
FIG. 8 is a perspective view of the merchandising strip of FIG. 7 shown while being repositioned on a surface.

The back removable adhesive layer 20 allows the strip 10 to be removably adhered to any flat surface and repositioned to the same or another flat surface. FIG. 8 is a perspective view of the merchandising strip 10 shown while being repositioned on a surface 26.

Figure 9:
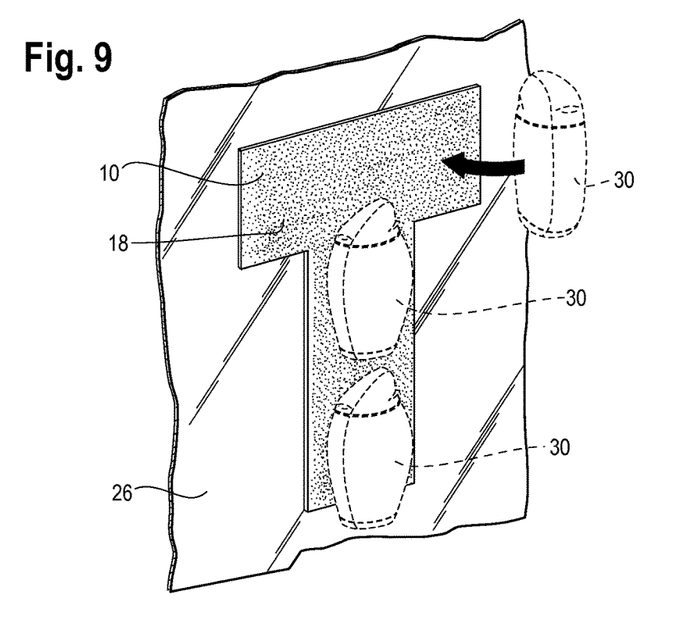
FIG. 9 is a perspective view of the merchandising strip of FIG. 7 shown with products.

FIG. 9 is a perspective view of the merchandising strip 10 of FIG. 7 shown with products 30. The products 30 may be any suitable products that can be removably adhered to the front removable adhesive layer 18. The strip 10 may be made in any suitable shape or dimension to carry as many products 30 as desired.

The front removable adhesive layer 18 should be suitably strong to hold the weight of a single packaged product 30 of the kind that may be displayed on a merchandising strip. On the other hand, the back removable adhesive layer 20 should be suitably strong to hold the weight of a number of packaged products 30 as well as the weight of the strip 10 itself.

It may be preferable from a weight and adhesion standpoint to use the strip 10 to display products packaged in flexible wrappers such as chips, candy bars, health food bars and the like. If the strip 10 is used to display rigid or semi-rigid products, it is preferred that each product comprise a container having a flat surface on its mounting (back) side.

Preferably, the strip 10 is at least as wide as the products 30 to better communicate a point-of-sale marketing message as the products 30 are removed from the strip 10.

The merchandising strip 10 described above is a T-shaped strip, but it should be understood that the display can have any appropriate shape, including the two alternative shapes that will now be described.

FIG. 10 is a perspective view of three I-shaped merchandising strips 32 shown displaying a number of packaged products 34. The strips 32 are adhered to a vertical surface 36 in parallel. The products 34 may be adhered to one strip 32 or to multiple adjacent strips 32 as shown in the figure.

FIG. 11 is a perspective view of a rectangular merchandising strip 40 shown with products 42. The products 42 may be arranged in any convenient manner on the strip 40, and may be aligned vertically and/or horizontally. The strip 40 has a first edge 44 and is positionable on the surface 36 in any orientation, including with the first edge 44 at the top as shown in the figure, with the first edge 44 on the side (by rotating the strip 40 ninety degrees either clockwise or counterclockwise from the orientation shown in the figure), with the first edge 44 on the bottom, or any orientation in between.

Second Embodiment

Figure 12:
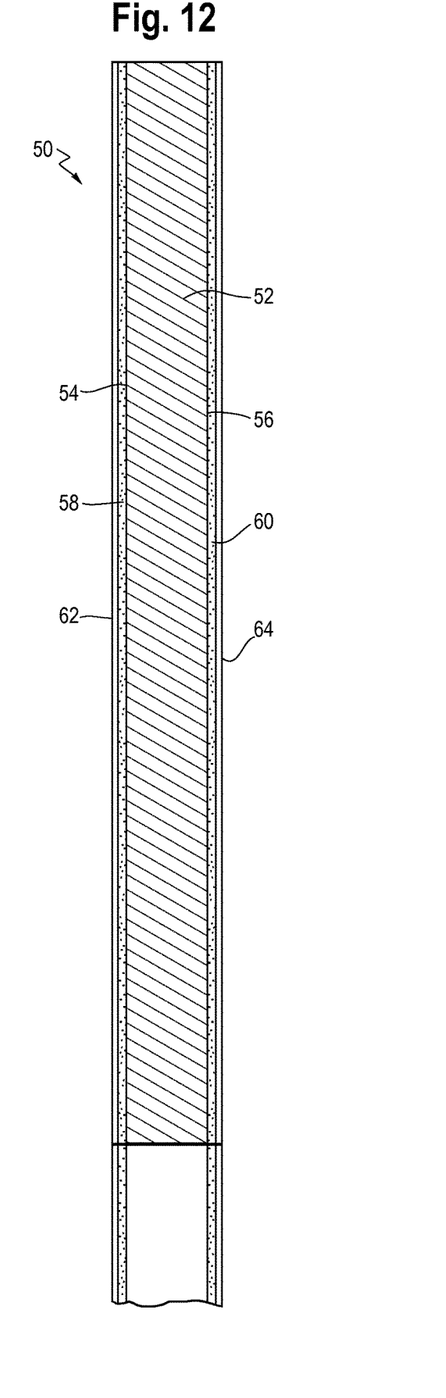
FIG. 12 is a side view of a merchandising strip according to a second embodiment.

FIG. 12 is a side view of a merchandising strip 50 according to a second embodiment. The strip 50 comprises a flexible substrate 52, preferably made of vinyl or other flexible material, having a front surface 54 and a back surface 56. The strip 50 further comprises a layer of front removable adhesive 58 applied to some or all of the front surface 54 and a layer of back removable adhesive 60 applied to some or all of the back surface 56.

The removable adhesives 58, 60 preferably are micro bead adhesives. The back removable adhesive layer 60 may be used for all applications and the front removable adhesive layer 58 may be used for medium weight applications (in which the products are medium weight products). The front removable adhesive layer 58 used for heavy applications (in which the products are heavy weight products) may be a proprietary pressure sensitive rubber based adhesive (PSA).

The strip 50 may further comprise a peel-away front layer 62 and a peel-away back layer 64. Preferably the peel-away front layer 62 is releasably attached to the front removable adhesive layer 58 and the peel-away back layer 64 is releasably attached to the back removable adhesive layer 60.

The substrate 52 may be a flexible strip made of vinyl or other flexible material that allows the strip to 50 adhere to curved surfaces in addition to flat surfaces. The substrate 52 may be 2 to 7 mil thick or any suitable thickness.

Third Embodiment

Figure 13:
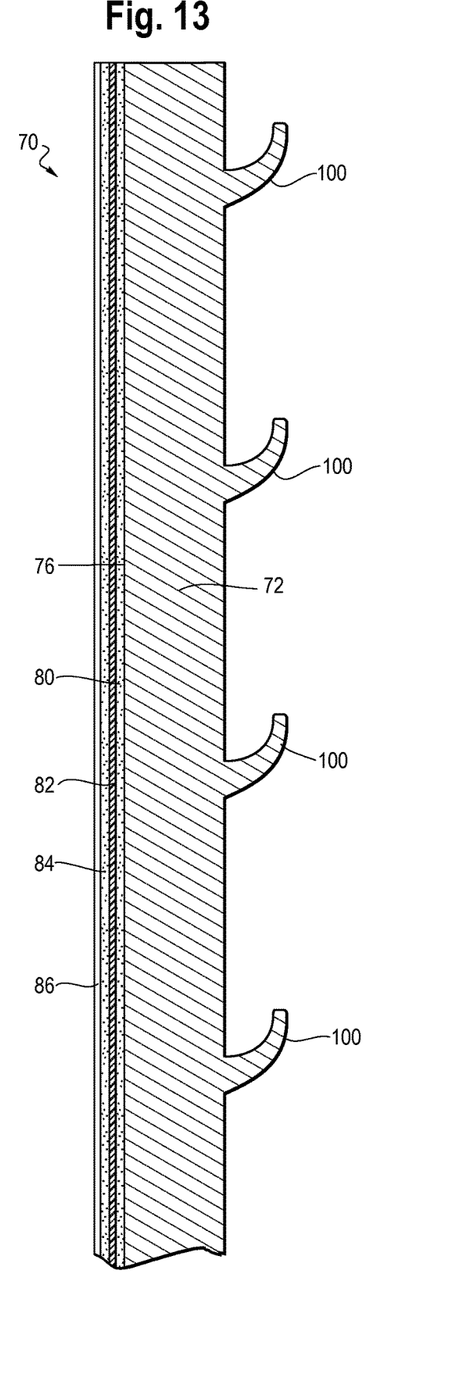
FIG. 13 is a side view of a merchandising strip according to a third embodiment.

FIG. 13 is a perspective view a merchandising strip 70 according to a third embodiment. As shown in the figure, the strip 70 may include die cut hooks 100, clips or other means to secure products (not shown) to the strip 70. More specifically, the strip 70 shown in FIG. 13 comprises a body 72, which may be rigid or flexible, having a front surface and a back surface 76. The strip 70 may further comprise a layer of back permanent adhesive 80 applied to some or all of the back surface 76 and a back carrier 82 adhered to the back permanent adhesive layer 80. The strip 70 further comprises a layer of back removable adhesive 84 applied to some or all of the back carrier 82 and a peel-away back layer 86 releasably attached to the back removable adhesive layer 84. The hooks 100 or other attachment means may be adhered to the front surface of the body 72 or may be an integral part of the body 72. The strip 70 may be repositioned from one surface to another without damaging the strip 70 of the surfaces.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A repositionable merchandising strip for displaying products, the strip comprising:
 a thin, flat body having a front surface and a back surface;
 a layer of front adhesive covering some or all of the front surface;
 a layer of back adhesive covering some or all of the back surface;
 a back carrier adhered to the layer of back adhesive;
 a layer of back removable adhesive disposed on some or all of the back carrier, the back removable adhesive layer allowing the strip to be removably adhered to a surface and repositioned to the same or a different surface;
 a peel-away back layer releasably attached to the back removable adhesive layer; and
 attachment means adhered to the body front surface by the front adhesive layer; wherein
 the strip can be removably adhered to a surface.

2. The repositionable merchandising strip of claim 1 wherein the attachment means comprises hooks.

3. The repositionable merchandising strip of claim 1 wherein the attachment means comprises hooks that are die cut from the body.

4. A repositionable merchandising strip for displaying multiple products, the strip comprising:
 a thin, flat body of unitary construction having a front surface and a back surface;
 a front permanent adhesive layer directly adjacent to and covering some or all of the front surface;
 a back permanent adhesive layer directly adjacent to and covering some or all of the back surface;
 a front carrier adhered to the front permanent adhesive layer;
 a back carrier adhered to the back permanent adhesive layer;
 a layer of front removable adhesive covering some or all of the front carrier to releasably hold the multiple products, the layer of front removable adhesive having a surface area large enough to accommodate the multiple products, the layer of front removable adhesive configured to enable one or more of the products to be separately removed and re-adhered to the strip; and
 a layer of back removable adhesive covering some or all of the back carrier; wherein
 the back removable adhesive layer allows the strip to be removably adhered to a surface and repositioned to the same or a different surface.

5. The merchandising strip of claim 4 wherein:
 the front removable adhesive layer and the back removable adhesive layer are layers of micro bead adhesive that do not form permanent bonds with the surface or with the products.

6. The merchandising strip of claim 5 further comprising a peel-away front layer releasably attached to the front removable adhesive layer and a peel-away back layer releasably attached to the back removable adhesive layer.

7. The merchandising strip of claim 6 wherein:
 the back removable adhesive layer covers the entire back surface.

8. The merchandising strip of claim 7 wherein:
 the strip has a first edge and is positionable on the surface with the first edge oriented up or down.

9. The merchandising strip of claim 7 wherein:
 the front removable adhesive layer and the back removable adhesive layer are made from the same adhesive.

10. The merchandising strip of claim 9 wherein:
 the front removable adhesive layer and the back removable adhesive layer are made from an acrylic based micro bead adhesive.

11. The merchandising strip of claim 4 wherein:
 the front removable adhesive layer and the back removable adhesive layer are made from different adhesives.

12. The merchandising strip of claim 11 wherein:
 the back removable adhesive layer is made from an acrylic based micro bead adhesive and the front removable adhesive layer is made from a pressure sensitive rubber based adhesive.

13. The merchandising strip of claim 4 wherein the strip is T-shaped.

* * * * *